United States Patent
Beckley et al.

(10) Patent No.: US 8,275,146 B2
(45) Date of Patent: Sep. 25, 2012

(54) TRIM PANEL ASSEMBLY FOR RETAINING AN ACOUSTICAL DEVICE

(75) Inventors: Daniel V. Beckley, Byron, MI (US); Victor Evjen, Highland, MI (US)

(73) Assignee: Magna International Inc., Aurora (CA)

( * ) Notice: Subject to any disclaimer, the term of this patent is extended or adjusted under 35 U.S.C. 154(b) by 1467 days.

(21) Appl. No.: 11/814,348

(22) PCT Filed: Jan. 17, 2006

(86) PCT No.: PCT/US2006/001539
§ 371 (c)(1), (2), (4) Date: Jul. 19, 2007

(87) PCT Pub. No.: WO2006/078623
PCT Pub. Date: Jul. 27, 2006

(65) Prior Publication Data
US 2010/0128889 A1      May 27, 2010

Related U.S. Application Data

(60) Provisional application No. 60/644,855, filed on Jan. 18, 2005.

(51) Int. Cl.
*H04B 1/00* (2006.01)
(52) U.S. Cl. .......................................................... 381/86
(58) Field of Classification Search .................... 381/86; 29/594
See application file for complete search history.

(56) References Cited

U.S. PATENT DOCUMENTS

| 3,351,719 A | 11/1967 | Schoengold |
| 6,611,606 B2 * | 8/2003 | Guenther ...................... 381/421 |
| 2002/0027999 A1 | 3/2002 | Azima et al. |

OTHER PUBLICATIONS

Patent Abstracts of Japan, JP2004-023484.
International Search report for PCT/US2006/001539.

* cited by examiner

*Primary Examiner* — Fernando L Toledo
*Assistant Examiner* — Neil Prasad
(74) *Attorney, Agent, or Firm* — Honigman Miller Schwartz and Cohn LLP

(57) ABSTRACT

A trim panel assembly for retaining an acoustical device, the trim panel assembly comprising a trim panel, and a voice coil, wherein at least a portion of the voice coil is partially embedded within a surface of the trim panel.

20 Claims, 1 Drawing Sheet though the top die may include locator pins (not shown) that extend into the bottom die to secure the components of the acoustical device, it should be appreciated that the present invention may be practiced with locator pins on either the top die or the bottom die.

TRIM PANEL ASSEMBLY FOR RETAINING AN ACOUSTICAL DEVICE

TECHNICAL FIELD

The present invention relates in general to the attachment of an accessory to a trim panel, and in particular to a trim panel with components of the accessory integrally formed with the trim panel.

BACKGROUND

An acoustic device, such as an electro-dynamic inertial vibration exciter, applies bending wave energy to a trim panel to cause the trim panel to resonate and produce an acoustic output. Conventional electro-dynamic inertial vibration exciters, or exciters, are comprised of a magnet assembly rigidly fixed to a housing to define an annular gap, and a voice coil and coil former assembly disposed in the annular gap and rigidly fixed to the trim panel.

SUMMARY

A trim panel assembly for retaining an acoustical device, the trim panel assembly comprising a trim panel, and a voice coil, wherein at least a portion of the voice coil is partially embedded within a surface of the trim panel.

DETAILED DESCRIPTION

Figure 1:
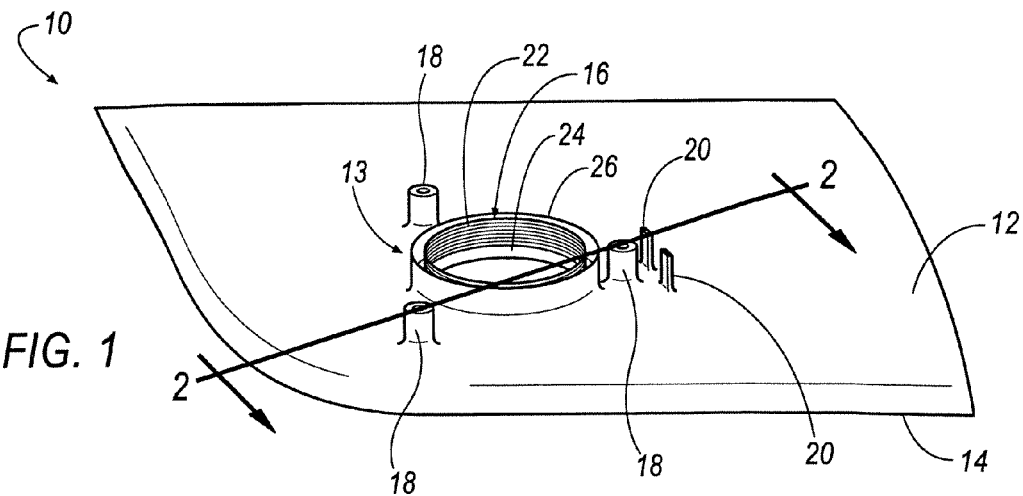
FIG. 1 is a perspective view of a trim panel assembly with components of an acoustical device, such as an exciter assembly, integrated into the trim panel according to an embodiment of the present invention.
Figure 2:
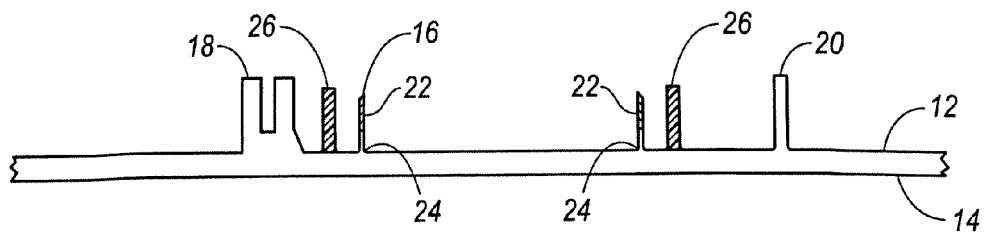
FIG. 2 is a cross-sectional view of the trim panel assembly taken along line 2-2 of FIG. 1 in accordance with an exemplary embodiment of the invention.

Referring to FIGS. 1 and 2, a trim panel assembly is generally shown at 10. The trim panel assembly 10 may be in the form of a vehicular headliner, door panel, valence panel, dashboard, package tray, or the like. For example, in the exemplary embodiment, the trim panel assembly 10 forms a door panel. The trim panel assembly 10 has in inner surface 12, or a Class "B" surface, that faces away from the interior of the vehicle and is not visible to the occupants. Trim panel assembly 10 includes an outer surface 14, or a Class "A" surface, that faces the interior of the vehicle and may be visible to the occupants. It can be appreciated that the trim panel assembly 10 may be formed from polymers, such as, for example, polyethylene, polypropylene, polystyrene, polyvinyl chloride, or the like. The polymers may be any type of polymer, including, for instance, thermoplastic or thermoset polymers. Furthermore, the trim panel assembly 10 may be a composite and therefore, include reinforcements, such as, for example, strands of glass fiber. A decorative covering (not shown) may be applied to the outer surface 14 for aesthetic purposes.

According to an exemplary embodiment of the present invention, the trim panel assembly 10 may be formed or manufactured, for example, by an injection molding process, a low compression molding process, a melt compression molding (MCM) process, or the like. For illustrative purposes, the trim panel assembly 10 according to an embodiment of the present invention is manufactured using a melt compression molding process. The trim panel assembly 10 may be manufactured from material in the form of a billet, pellet, powder, pre-formed blank, or the like.

In an embodiment, material is placed in a bottom die (not shown) of a melt compression mold tool (not shown). A top die (not shown) is then closed over the bottom die. Heat from the bottom die and the pressure from the top die serves to melt and form the material. As the material melts, the pressure from the top die causes the material to spread and fill the bottom die. The end result of a cycle within the melt compression molding tool is that the material forms a trim panel assembly. It can be appreciated that the material may be preheated and placed into the melt compression mold tool in a softened, or at least a partially melted, state. As a result, the melt compression mold tool does not require the use of the heat; however, the process of making a trim panel assembly remains substantially the same. However, it can be appreciated that a trim panel assembly may be manufactured using any other manufacturing process.

Figure 3:
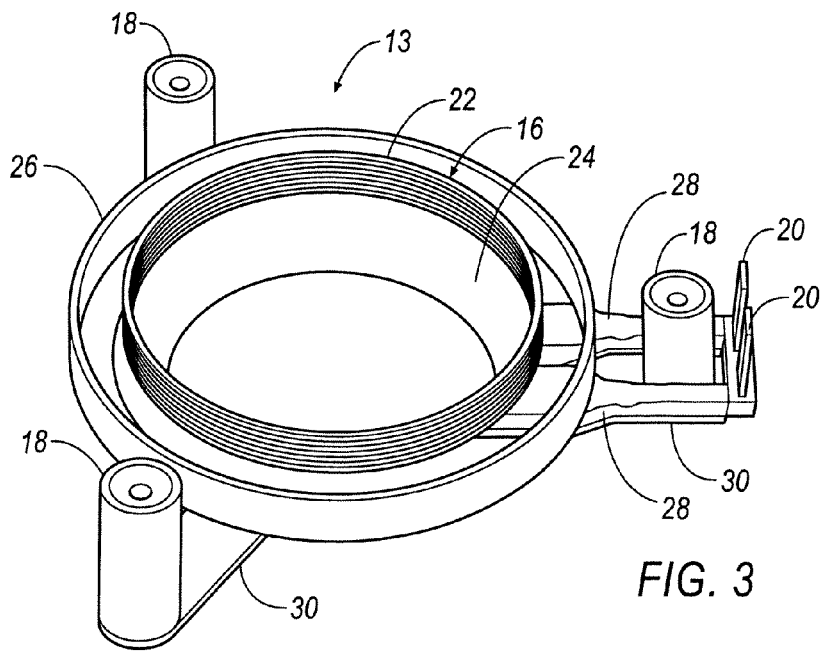
FIG. 3 is a perspective view of components of an acoustical device, such as an exciter, that is intended to be integrated into a trim panel according to an embodiment of the invention.

According to an exemplary embodiment of the invention, components of an acoustical device, such as, an electro-dynamic inertial vibration exciter, or the like, may be integrated into an inner surface of a trim panel assembly. For example, as illustrated in FIG. 3, the component 13 of the acoustical device integrated that is intended to be integrated into the inner surface 12 of the trim panel assembly 10 may include, for example, a coil assembly 16, having a voice coil 22 wound around a tubular coil member 24, a plurality of screw bosses 18, a set of connector leads 20 and an elastomer seal 26. The coil assembly 16 is coupled to the set of connector leads 20 at solder joints 28. The screw bosses 18 in the illustrated embodiment are shown coupled to the tubular coil member 24 by joints 30. The elastomer seal 26 may be placed between the tubular coil member 24 and the screw bosses 18 and over the joints 30. In the illustrated embodiment, the plurality of screw bosses 18 includes three screw bosses. However, it can be appreciated that the present invention can be practiced with any number of screw bosses 18, or other securing formation, so long as the screw bosses 18 or formations can secure the intended components (not shown) of the acoustical device to the trim panel assembly 10.

In an embodiment of a method of the invention, components that are intended to be attached to a trim panel assembly are integrated into the trim panel assembly 10 during a mold-in-place manufacturing process. In the described embodiment, initially, one of the coil assembly 16, the plurality of screw bosses 18, the connector leads 20 and the elastomer seal 26 of the acoustical device may be secured to either the top die or the bottom die of the mold (e.g., a melt compression mold tool). Components, such as component 13, can be secured to a melt compression mold tool by any conventional means. For example, components 13 of an acoustical device may be secured to locator pins (not shown) on either the top and/or bottom die of the melt compression mold tool. The locator pins may be inserted into the screw bosses 18 to secure coil assembly 16, screw bosses 18, connector leads 20 and elastomer seal 26 of the acoustical device to the melt compression mold tool. It should be noted that if the locator pins are on the top die, the elastomer seal 26 may be attached to the acoustical device as a secondary step. Material is then placed onto the bottom die of the melt compression mold tool and the melt compression mold tool is closed. When the top die is closed over the bottom die, the components of the acoustical device are partially immersed into the material on the bottom die. At the end of the manufacturing cycle, when the melt compression mold tool is opened and the trim panel assembly is removed, a coil assembly, the screw bosses or formations, connector leads and an elastomer seal of the acoustical device may be integrated into the trim panel assembly.

In an alternate embodiment of a method of the invention, the screw bosses 18 or formations can be omitted from the components 13 that are molded-in-place into the trim panel assembly 10. Instead, the screw bosses 18 or formations may be in-molded as part of the inner surface 12 of the trim panel assembly 10. The manufacturing process of the trim panel assembly according to the aforementioned alternate embodiment of the invention may be substantially the same as the manufacture of the trim panel assembly 10; however, the components 13 of the acoustical device integrated into the inner surface 12 of the trim panel assembly 10 may only include the coil assembly 16, the plurality of connector leads 20 and the elastomer seal 26.

Assembly of the acoustical device may be completed by placing a magnet (not shown) and a spring (not shown) over the coil assembly 16. The magnet and the spring may be secured to the trim panel assembly 10 by fasteners, such as screws, that engage or connect with the screw bosses 18 or other securing formations.

The embodiments disclosed herein have been discussed for the purpose of familiarizing the reader with novel aspects of the invention. Although preferred embodiments of the invention have been shown and described, many changes, modifications and substitutions may be made by one having ordinary skill in the art without necessarily departing from the spirit and scope of the invention as described in the following claims.

The invention claimed is:

1. A trim panel assembly for retaining an acoustical device having a magnet, the trim panel assembly comprising:
    a trim panel made of mold material having an inner surface and an outer surface and defining a volume of material between the inner surface and the outer surface; and
    a voice coil at least partially molded into the volume of material such that:
        (1) a first portion of the voice coil is embedded within the volume of material while
        (2) a second portion of the voice coil extends beyond the inner surface and is not embedded within the volume of material, wherein the voice coil is adapted to be secured to a magnet placed outside the volume of material.

2. A trim panel assembly according to claim 1, wherein the inner surface defines a recess for supporting the external magnet.

3. The trim panel assembly from claim 1, further comprising:
    at least one component associated with a connection of said acoustical device to the trim panel, said at least one component at least partially molded into the trim panel such that at least a first portion of said at least one component becomes embedded within the volume of material while a second portion of the at least one component extends beyond the inner surface and is not embedded within the volume of material.

4. The trim panel assembly according to claim 3, wherein the at least one component includes at least one of a retention boss and a seal.

5. The trim panel assembly according to claim 3, wherein at least one of the at least one component is integrally formed with the trim panel.

6. The trim panel assembly according to claim 1, further comprising a tubular coil member at least partially molded into the trim panel such that at least a first portion of said tubular coil member becomes embedded within the volume of material while a second portion of the tubular coil member extends beyond the inner surface and is not embedded within the volume of material, and wherein the voice coil is wound around or about the tubular coil member whereby the combination of the voice coil and the tubular coil member defines a coil assembly.

7. The trim panel assembly according to claim 6, further comprising a lead at least partially molded into the trim panel such that at least a first portion of said lead becomes embedded within the volume of material while a second portion of the lead extends beyond the inner surface and is not embedded within the volume of material, and wherein the lead is electrically coupled to the coil assembly.

8. The trim panel assembly according to claim 6, further comprising a seal at least partially molded into the trim panel such that at least a first portion of said seal becomes embedded within the volume of material while a second portion of the seal extends beyond the inner surface and is not embedded within the volume of material, wherein the coil assembly generally defines a first diameter and the seal generally defines a second diameter, and further wherein the second diameter is greater than the first diameter.

9. The trim panel assembly according to claim 6, further comprising at least one retention boss coupled to the tubular coil member.

10. The trim panel assembly according to claim 9, further comprising one or more joints, wherein at least one of the one or more joints corresponds to the at least one retention boss for connecting or coupling the retention boss to the tubular coil member.

11. The trim panel assembly according to claim 10, wherein at least one of the one or more joints is completely molded into the trim panel.

12. The trim panel assembly according to claim 3, further comprising an acoustical device formatted for retention by the at least one component such that the acoustical device forms an operative connection with the voice coil.

13. The retention assembly according to claim 12, wherein the acoustical device comprises an electro-dynamic inertial vibration exciter.

14. A method of manufacturing a trim panel assembly for retaining an acoustical device having a magnet, the panel assembly including a voice coil, the method comprising:
    placing the voice coil in a mold;
    placing a predetermined amount of a material within the mold; and
    molding the voice coil with the predetermined amount of material into a trim panel such that:
        (1) a first portion of the coil assembly becomes at least partially embedded within the trim panel directly by the mold material while
        (2) a second portion of the coil assembly extends beyond an exterior surface of the trim panel and is not embedded within the trim panel.

15. The method according to claim 14, further including a step of applying heat to the material in the mold.

16. The method according to claim 14, further including a step of applying pressure to the material in the mold.

17. The method according to claim 12, wherein the panel assembly further includes at least one component associated with the retention of said acoustical device, and further wherein the step of placing the coil assembly in the mold further comprises the step of placing the at least one component in the mold.

18. The method according to claim 14, wherein the panel assembly further includes at least one component associated with the retention of said acoustical device, and wherein the mold is configured to integrally form the at least one component on the panel.

19. The method according to claim 14, wherein the mold includes at least one locator that is positioned to correspond with a desired position of the coil assembly, and the method further comprises a step of locating the coil assembly within the material using the locator.

20. The method according to claim 14, wherein the trim panel assembly further comprises a tubular coil member, and wherein the method further comprises a step of winding the voice coil around or about the tubular coil member to form a coil assembly.

* * * * *